(12) United States Patent
Herger et al.

(10) Patent No.: US 10,242,237 B2
(45) Date of Patent: *Mar. 26, 2019

(54) CONTEMPORANEOUS FACIAL GESTURE AND KEYBOARD ENTRY AUTHENTICATION

(71) Applicant: International Business Machines Corporation, Armonk, NY (US)

(72) Inventors: Lorraine Herger, Port Chester, NY (US); Neal Keller, Pleasantville, NY (US); James R. Kozloski, New Fairfield, CT (US); Matthew A. McCarthy, Holly Springs, NC (US); Clifford A. Pickover, Yorktown Heights, NY (US); Andrew Wyskida, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/914,156

(22) Filed: Mar. 7, 2018

(65) Prior Publication Data

US 2018/0196966 A1 Jul. 12, 2018

Related U.S. Application Data

(63) Continuation of application No. 15/135,636, filed on Apr. 22, 2016, now Pat. No. 9,990,517, which is a
(Continued)

(51) Int. Cl.
*G06F 21/83* (2013.01)
*H04L 29/06* (2006.01)
(Continued)

(52) U.S. Cl.
CPC .............. *G06F 21/83* (2013.01); *G06F 3/017* (2013.01); *G06F 3/02* (2013.01); *G06F 3/023* (2013.01);
(Continued)

(58) Field of Classification Search
CPC . G06F 21/32; G06F 3/02; G06F 3/017; G06F 21/83; G06F 21/6218; G06F 3/023;
(Continued)

(56) References Cited

U.S. PATENT DOCUMENTS 8,261,090 B1 9/2012 Matsuoka
8,457,367 B1 6/2013 Sipe et al.
(Continued)

FOREIGN PATENT DOCUMENTS

EP 2182469 5/2010

OTHER PUBLICATIONS

Shukran, M. A. M., et al., "Kinect-based Gesture Password Recognition", Australian Journal of Basic and Applied Sciences, Jul. 2012, pp. 492-499, vol. 6, Issue 8. ISSN 1991-8178.
(Continued)

*Primary Examiner* — Meng Li
(74) *Attorney, Agent, or Firm* — Fleit Gibbons Gutman Bongini Bianco PL; Jon A. Gibbons

(57) ABSTRACT

A restricted access device such as a cellphone, a tablet or a personal computer, analyzes contemporaneous keyboard inputs of a password and gestures to authenticate the user and enable further access to applications and processes of the restricted access device. The gestures may be facial gestures detected by a camera or may be gestures made by an avatar rendered on a display of the device. The password may be shorted based upon the context of the authentication as well as any gestures occurring during password entry. The
(Continued)

gestures may be learned by the restricted access device during the password entry process.

20 Claims, 7 Drawing Sheets

Related U.S. Application Data continuation of application No. 14/199,467, filed on Mar. 6, 2014, now Pat. No. 9,348,989.

(51) Int. Cl.

| | | |
|---|---|---|
| *G06F 21/32* | (2013.01) | |
| *G06F 3/01* | (2006.01) | |
| *G06F 3/02* | (2006.01) | |
| *G06K 9/00* | (2006.01) | |
| *G06F 3/023* | (2006.01) | |
| *G06F 21/62* | (2013.01) | |

(52) U.S. Cl.
CPC .......... *G06F 21/32* (2013.01); *G06F 21/6218* (2013.01); *G06K 9/00302* (2013.01); *G06K 9/00315* (2013.01); *G06K 9/00355* (2013.01); *G06K 9/00892* (2013.01); *H04L 63/083* (2013.01); *H04L 63/0861* (2013.01); *G06F 2203/0381* (2013.01)

(58) Field of Classification Search
CPC ........ G06F 2203/0381; G06K 9/00355; G06K 9/00315; G06K 9/00892; G06K 9/00302; H04L 63/083; H04L 63/0861
See application file for complete search history.

(56) References Cited

U.S. PATENT DOCUMENTS

| | | | |
|---|---|---|---|
| 2005/0021340 A1* | 1/2005 | Steinbiss | G06F 21/32 704/273 |
| 2007/0180504 A1* | 8/2007 | Hung | G06F 21/335 726/5 |
| 2008/0010674 A1* | 1/2008 | Lee | G06F 21/32 726/7 |
| 2010/0109998 A1 | 5/2010 | Hwang et al. | |
| 2011/0093820 A1 | 4/2011 | Zhang et al. | |
| 2012/0075452 A1 | 3/2012 | Ferren | |
| 2012/0081282 A1 | 4/2012 | Chin | |
| 2012/0226812 A1 | 9/2012 | Ren et al. | |
| 2012/0320181 A1 | 12/2012 | Hong et al. | |
| 2013/0004016 A1 | 1/2013 | Karakotsios et al. | |
| 2013/0015946 A1* | 1/2013 | Lau | G07C 9/00 340/5.2 |
| 2013/0257734 A1* | 10/2013 | Marti | G06F 1/1686 345/168 |
| 2014/0019873 A1 | 1/2014 | Gupta et al. | |
| 2014/0297433 A1 | 10/2014 | Bielamowicz et al. | |

OTHER PUBLICATIONS

Trewin, S., et al., "Biometric Authentication on a Mobile Device: A Study of User Effort, Error and Task Disruption", Proceedings of the 28th Annual Computer Security Applications Conference, Dec. 2012, pp. 159-168. Copyright 2012 ACM 978-1-4503-1312-4/12/12.

Non-Final Office Action for U.S. Appl. No. 15/135,636 dated Sep. 15, 2017.

* cited by examiner

CONTEMPORANEOUS FACIAL GESTURE AND KEYBOARD ENTRY AUTHENTICATION

BACKGROUND

The present description generally relates to access restricted devices and more particularly to enabling access based upon simultaneous keyboard entries and gestures.

Access restricted devices may use a password entry upon a keyboard to enable increased access to the device. Increased access includes unlocking the device, allowing a user access to the applications, processes and resources associated with a device. Such devices include cell phones, tablets, laptops, and computers. Still other methods of enabling access to a device include a gesture or a match of biometric identification such as a fingerprint or rental scan.

SUMMARY

The description includes a method comprising enabling increased access to a restricted access device based upon a gesture event contemporaneously occurring while receiving a predetermined keyboard entry from a user accessing the restricted access device.

The description also includes a restricted access device comprising: a keyboard processing module for receiving a keyboard input signal from a keyboard having a plurality of keys for receiving a keyboard entry and determining the keyboard entry corresponds to a password; a gesture processing module for processing a gesture input signal from a gesture detector for detecting a gesture event and for determining the gesture event corresponds to a predetermined gesture event; and an access controller coupled to the keyboard processing module and the gesture processing module for increasing access to the restricted access device based upon the determining of the gesture event occurring contemporaneously with the password.

The description also includes a non-transitory computer program product comprising a storage medium readable by a processing circuit and storing instructions for execution by the processing circuit of an application server for performing a method comprising enabling increased access to a restricted access device based upon a gesture event contemporaneously occurring while receiving a predetermined keyboard entry from a user accessing the restricted access device.

BRIEF DESCRIPTION OF THE SEVERAL VIEWS OF THE DRAWINGS

The accompanying figures wherein reference numerals refer to identical or functionally similar elements throughout the separate views, and which together with the detailed description below are incorporated in and form part of the specification, serve to further illustrate various embodiments and to explain various principles and advantages all in accordance with the present description, in which.

DETAILED DESCRIPTION

Figure 1A:
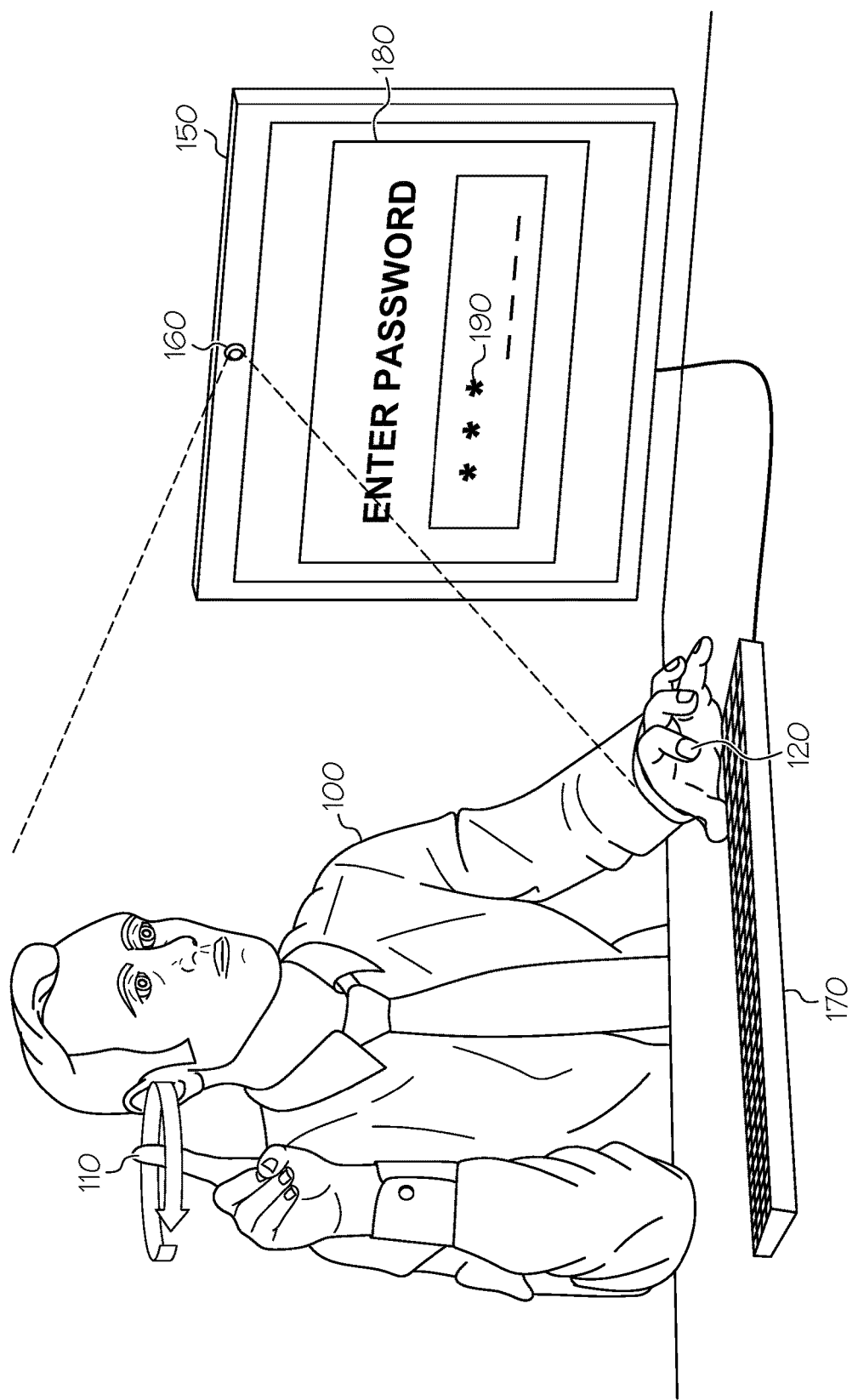
FIG. 1A through FIG. 1D illustrate an example of contemporaneous gesture and keyboard entry authentication by a user for increasing access to a restricted access device.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present disclosure has been presented for purposes of illustration and description, but is not intended to be exhaustive or limited in the form disclosed. Many modifications and variations will be apparent to those of ordinary skill in the art without departing from the scope of the description. The embodiment was chosen and described in order to best explain the principles of the description and the practical application, and to enable others of ordinary skill in the art to understand the description for various embodiments with various modifications as are suited to the particular use contemplated.

The terminology used herein is for the purpose of describing particular embodiments only and is not intended to be limiting of the description. As used herein, the singular forms "a", "an" and "the" are intended to include the plural forms as well, unless the context clearly indicates otherwise.

The terms "comprises" and/or "comprising," specify the presence of stated features, steps, operations, elements, and/or components, but do not preclude the presence or addition of one or more other features, integers, steps, operations, elements, components, and/or groups thereof.

Disclosed is a password-entry system on a mobile, or other, device (e.g. tablet computer or smart phone) that uses a simultaneous facial gesture to affect the nature of the text password. For example, a portion of the alphanumeric password may need to be entered while the facial gesture is a smile, but the last character of the password needs to be entered while the facial gesture is not a smile. This increases security for a given number of input characters. Extensions include virtual universes where alphanumeric passwords depend upon avatar facial expression and/or gestures.

User password entry, using real or virtual keys, may be cumbersome on a mobile device, or other device. By combining facial expression or gesture (e.g. smile) with text password entry, a user may have a more secure password for a given number of key selections. Contemporaneous facial gestures during password entry may also thwart "shoulder surfing" where another looks over the shoulder of a user during password entry to steal a password. It may further deter theft if a potential burglar knows that password entry is difficult due to requirements with respect to contemporaneous facial gestures.

Combining facial gestures (e.g. smile, blink, frown, open mouth, closed mouth,) with password entry, a user may have a more secure password for a given number of key selections. For example, consider a password consisting of 6 characters: $c_1$, $c_2$, $c_3$, $c_4$, $c_5$, and $c_6$. As an example, if $c_5$ was dependent on facial gesture, then the number of possibilities now is expanded to include: $c_1$, $c_2$, $c_3$, $c_4$, $c_5$ (contemporaneous smile/frown), and $c_6$. This provides an additional security feature. The user's password cannot be easily guessed or hacked since the device/application/files are not accessible if the password entry is not simultaneously accompanied by the appropriate facial gesture or expression during the alphanumeric entry password process. Many devices are equipped with cameras, thus facilitating this implementation.

A combination of letters and facial gesture may be hashed with a private key. The facial gesture may often be hidden and undetectable unless watching a person enter the password. This may be implemented with two different authentication streams by two different servers. For example, on a second authentication server, the key before and after was X, and the user smiled. Facial gesture and text are combined as a function of a private key Note that this invention may have a human-accessibility aspect in that the number of typed characters may be reduced. In one example the reduction may be for someone with hand-control deficits but who retains facial or other motor control. For example, instead of eight characters, a user with motor deficit or painful hand muscles may only now need to enter four characters, with contemporaneous facial gestures detected by a camera that is already in a user's device. Note also that for the purpose of accessibility (e.g. a blind user, stroke victim, etc.), in a related embodiment, the combination of letters and gestures need not involve facial expressions but may involve some other type of gesture movement over which a user may have adequate control. For example, a hand motion, speaking a certain word while pressing a key, or some other type of movement or gesture that may be made contemporaneously, or at the same time a key or password is selected. In addition, to protect a user who may not be fully aware that someone else is nearby and "shoulder surfing" in an attempt to observe password entry and steal the password, verbal or other cues or gestures may guard against misappropriating the password.

In another example, an animation of facial gestures may be used, in a manner similar as described for the static facial gestures, to provide an additional variable for alphanumerical password entry. For example, the password of "robot" may require a fast or slow pursing of the lips (which may be represented as sinusoidal amplitude through time) during the entry of the letter "t" to enter unlock the corresponding process or application. Filters may be applied to the facial gesture animation signal so as to filter out spurious noise and to make it easier for users to enter facial patterns, such as "fast" versus "slow" smile oscillations. Additionally, a contemporaneous input of a user's voice such as a tone, whistle, exhalation noise, or song (sung or hummed) may be employed either as a gesture or in combination with a static or animated facial gesture, as an extra layer of security.

Context, including authentication setting and time of day may also be used in relation to the authentication system. Additionally, for reasons of safety, this password may have additional advantages. For example, the facial gesture may be used only during certain times of day or in certain settings, such as driving. The device may either be configured to accept these alternate passwords in these settings, or the user may have an alternate password entry method available. For example, in the unexpected event that the setting is not secure for facial gesture passwords, where other may observe these gestures the alternate gestures may be used. For example, a user who is driving can enter keystrokes $c_1$, $c_2$, $c_3$, followed by a facial gesture combined with $c_4$, thus providing a password with fewer alphanumeric keystrokes and a margin of safety. In another example, the user may enter the full password using only alphanumeric key strokes $c_1$, $c_2$, $c_3$, $c_4$, $c_5$, $c_6$ in a restaurant. This affords the user a simpler and safer entry method while driving, and a more secure entry method while in a public place. Furthermore, certain mappings may be set by the user from certain key combinations onto certain facial gestures for the purpose of entering a password. For example, "sm" may correspond to the characters $c_5$ and $c_6$ in the user's password, and the user may have mapped these to a smile facial gesture. This mapping then provides for entering text using facial gestures.

Also described is a password entry device able to learn the correspondence between certain key combinations and certain facial gestures over time, where a user may "teach" the system that, for example, "sm" corresponds to the smile gesture by smiling whenever "sm" is entered. After several times entering the full password in this way, the system may automatically permit or inquire of a user to whether the shortened password with a smile during the entry of $c_5$ and $c_6$ as an alternate password. Similarly, the password entry device may optionally learn the correspondence between vocal output (e.g. humming of certain songs) and certain key combinations of facial gestures over time. The system may automatically permit a user to hum a song as a shortened password but only in familiar surroundings such as their home, as indicated by a GPS reading on their smartphone, while requiring fuller multi-modal password entry in new locations.

The current invention does not involve the positive identification of an individual and is therefore not a biometric invention. Thus, the disclosure has potential advantages when a device is shared between multiple individuals, such as a home theater system with a password protected movie purchasing feature. In this setting, any of several users may want to enable a password protected movie. Common facing gestures may be learned by anyone wishing to use the device, and may be performed in conjunction with alphanumeric keystrokes by anyone. The system authenticates by identifying a smile or a frown or other gesture in combination with a password, but not the specific biometrics uniquely identifying the individual face making these gestures. Access may be enabled by anyone entering the keyboard password and corresponding gestures.

Another potential advantage includes the ability for a single device to maintain a password for different individuals who share a portion but not all of a style of alphanumeric keyboard as their languages entry device. For example, a Chinese, Russian, and English speaking individual may share a device with a password comprising only numeric keystrokes and facial gestures. This is because Arabic numbers are widely shared on devices, and because facial gestures are universally recognized while the language specific alpha characters may differ widely between languages.

In a virtual universe or 3D game, in which users are represented by avatars that traverse a 3-D virtual environment, the facial gesture passwords may make use of avatar facial expressions that are contemporaneous with text input. For example, password entry may be affected by facial expression of the avatar with respect to the environment. For example, a password of "robot" may require that the letter "b" be typed, or spoken, when the avatar has a certain facial expression or is posed in a sitting position or is exhibiting a certain other gesture. When online financial transitions in a virtual universe take place involving substantial amounts of money, such extra security measures in the virtual universe may have the advantage of being useful in deterring the misappropriation of passwords and avoiding the consequences.

In another example, an element of randomness may be incorporated into the password entry. For example, the multi-factor authentication may be strengthened using random combinations of simultaneous or sequential password entry with multiple facial expressions. For example, to set up this authentication method, the user may do the following: 1) choose/enter a unique password, 2) choose four unique facial expressions (e.g. smile, wink left eye, turn head right, open mouth), record the four unique facial expressions. The authentication system may prompt user "in random order" to simultaneously or sequentially enter the password while performing one or more of the chosen facial expressions. Thus, the user authentication prompts may follow randomly selected combinations (changes each time user authenticates), e.g. turn head right, smile+enter password, wink left eye, and execute authentication.

In an example of a home theater implementation, different levels of complexity of the password/gesture combination allow for a possibly greater component access. For example, a simple password (4 characters+smile) that allows general access to control home theater components, while purchasing movies requires a more complex password (8 character+ minimum 3 gestures).

The description includes a user input device sensitive to gestures (e.g. a facial gesture like a smile), an alphanumeric input device such as a keyboard, and the creation of a password that simultaneously combines the concurrent entry of the facial gesture and alphanumeric input. The device includes any of: phone, computer, e-book, tablet computer, camera, smart wallet, smart card, watch. The alphanumeric device includes any of: real keyboard, virtual keyboard, pointer, speech system, gesture recognizer, or a virtual tablet in a virtual world. The facial gesture may be animated (e.g. an oscillation of a smile and a frown for 1 second). The user may be represented in a virtual universe, and the password entry is affected by avatar facial gesture or avatar body position (e.g. sitting vs. standing).

FIG. 1A through FIG. 1D illustrate an example of contemporaneous gesture and keyboard entry authentication by a user for increasing access to a restricted access device. User 100 is performing an authentication act for increasing access to restricted access device 150. FIG. 1A shows that a user 100 with a straight face performing a gesture 110 with one hand while entering a keystroke 120 with the other hand on keyboard 170. Device 150 also includes a camera 160 for capturing images of user 110 and operates a process able to determine gestures of the user in a manner known to those familiar with the art. Device 150 includes a display 180 that is displaying a password entry screen, and showing the keystroke entry 120 correspond to the third keyboard entry 190 of the password. For the example of this figure, the user is performing hand gesture 110 while contemporaneously entering keystroke 120 on the third character 190 of the password.

Figure 1B:
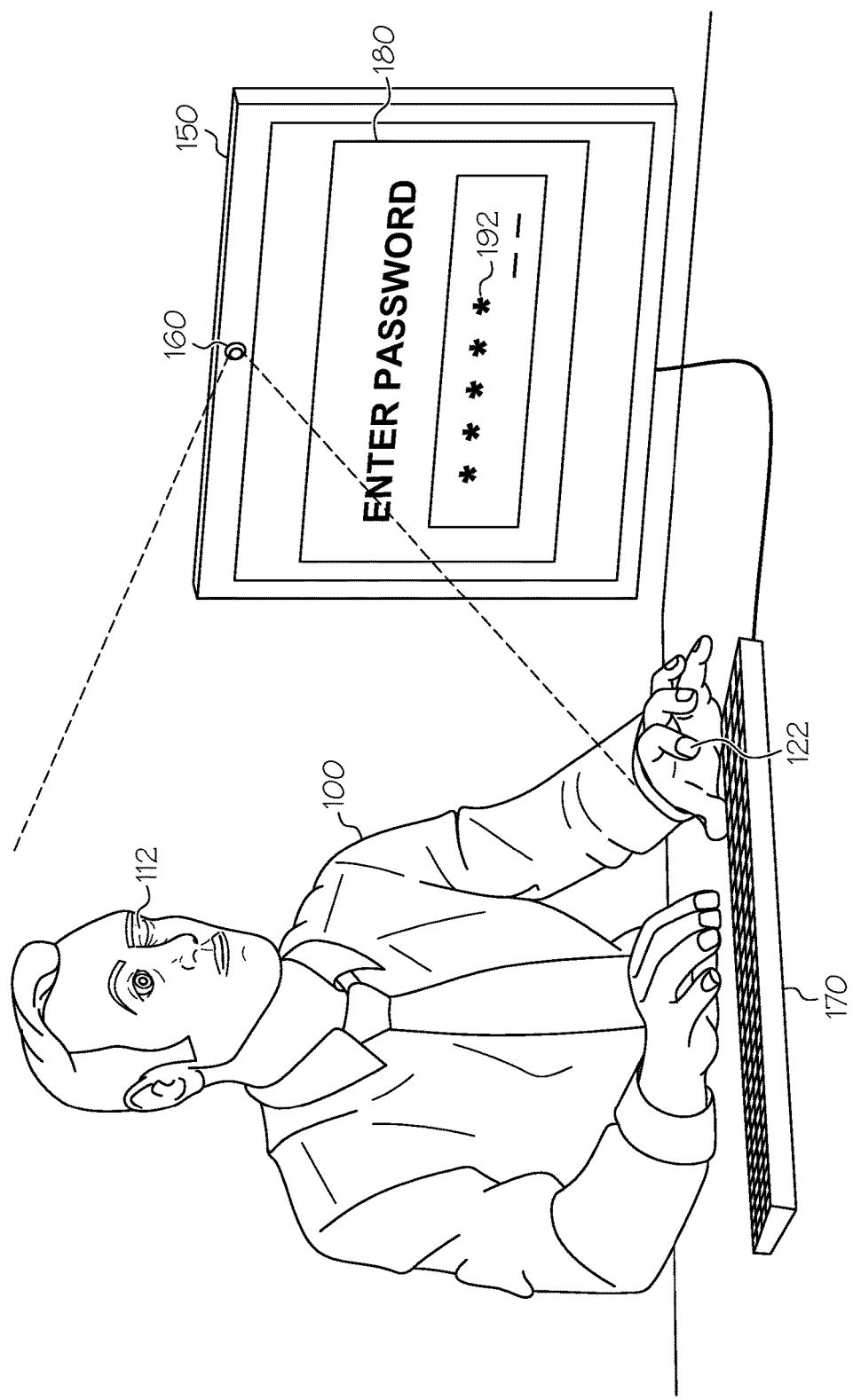

FIG. 1B shows that the user 100 is performing a second gesture 112, corresponding to a wink of an eye facial gesture, which is captured by camera 160 and processed by device 150 while the user is entering a fifth character 192 of a password as displayed on display 180. The fifth character is entered upon the keyboard 170 with keystroke 122. For the example of this figure, the user is performing winking facial gesture 112 while contemporaneously entering keystroke 122 on the fifth character 192 of the password.

Figure 1C:
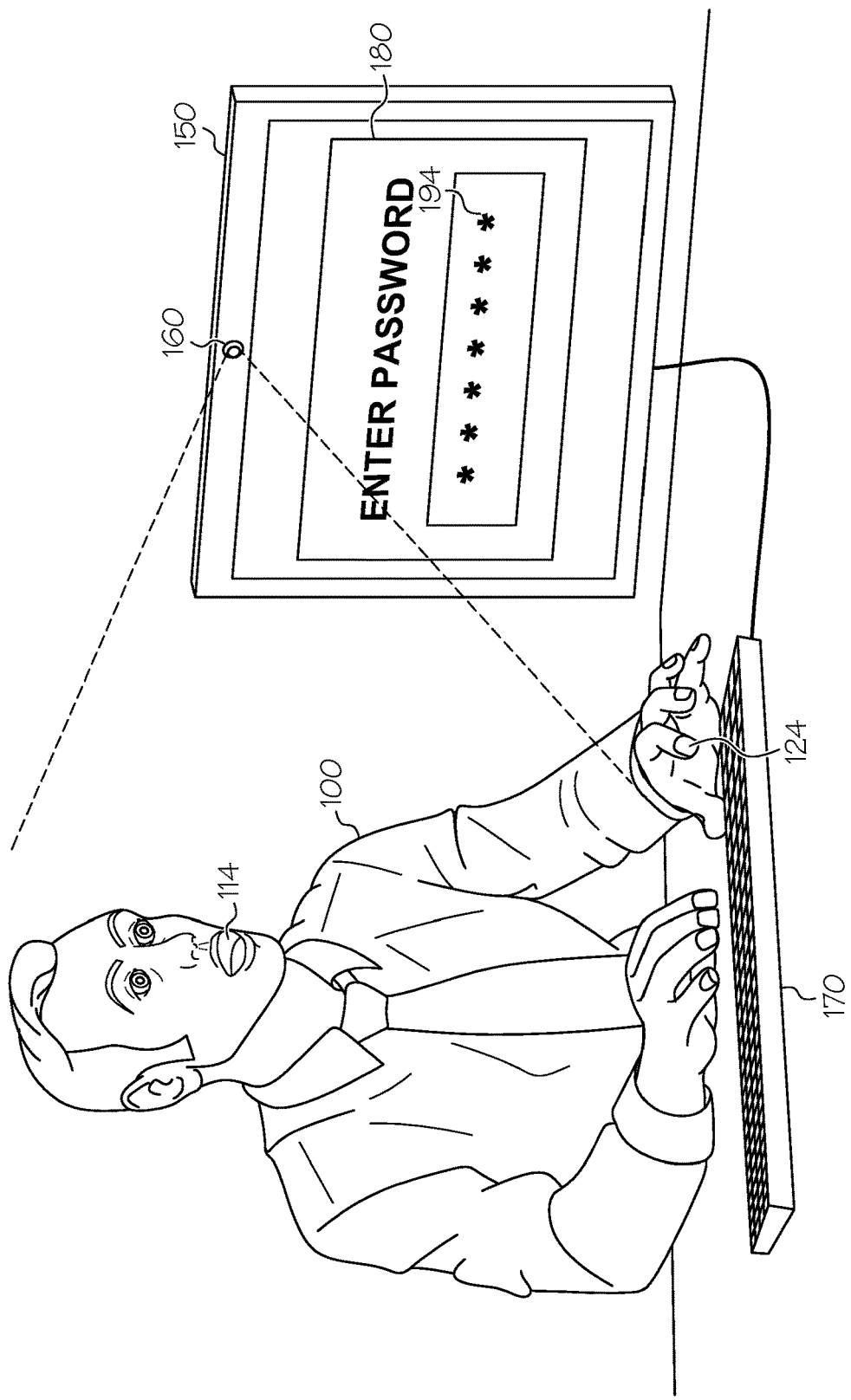

FIG. 1C shows that the user 100 is performing a third gesture 114, corresponding to an open mouth facial gesture, which is captured by camera 160 and processed by device 150 while the user is entering a seventh character 194 of a password as displayed on display 180. The seventh character is entered upon the keyboard 170 with keystroke 124. For the example of this figure, the user must be performing an open mouth facial gesture 114 while entering keystroke 124 on the seventh character 194 of the password.

Figure 1D:
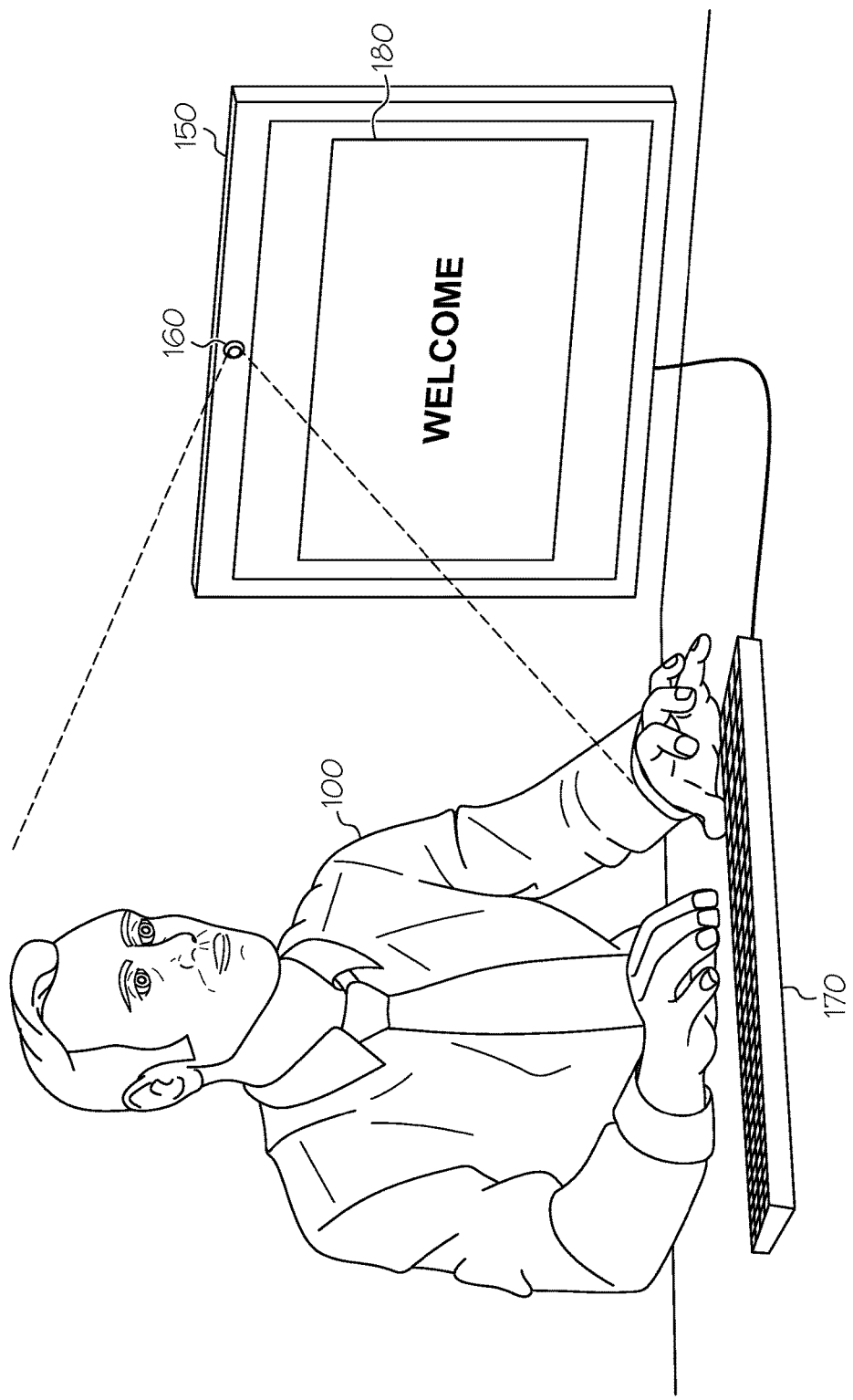

FIG. 1D shows device 150 displaying a welcome screen on display 150 to user 100 based upon the proper entry of the password on the keyboard 170 and the proper reception of gestures by camera 160. Thus, increased access to a restricted access device is enabled based upon an at least one gesture event occurring while receiving an at least one predetermined keyboard entry from a user accessing the restricted access device.

FIG. 1A through FIG. 1D show three gestures occurring at the third, fifth and seventh keystroke entries of a password in order to provide authentication for increased access to the restricted access device. In this example, if the three gestures had not occurred in coincidence with the corresponding keystrokes, the user would not be authenticated and the increased access to the device would not be enabled. Many other example combinations of keystrokes and gestures may be implemented while remaining within the scope of this description. For example, in addition to the previous examples, any gesture may be used and any keyboard may be used. The gesture may be a facial gesture, a body gesture or any other gesture known to those familiar with the art. Possible keyboards include an alphanumeric keyboard, a numeric keyboard, a non-English keyboard, or a single button. In one example a single gesture and a single keystroke may provide increased access to the device. In another example, multiple keystrokes may be required and one or more gestures may need to occur anywhere within the multiple keystrokes. For example, the user may need to wink at any time during entry of a multiple character password. Furthermore the gesture may be a dynamic gesture requiring several motions to complete, for example the user may need wink once with each eye or wink multiple times with one eye to perform gesture. While a camera is used for gesture detection, any device able to detect gestures is considered to be within the scope of the description.

Figure 2:
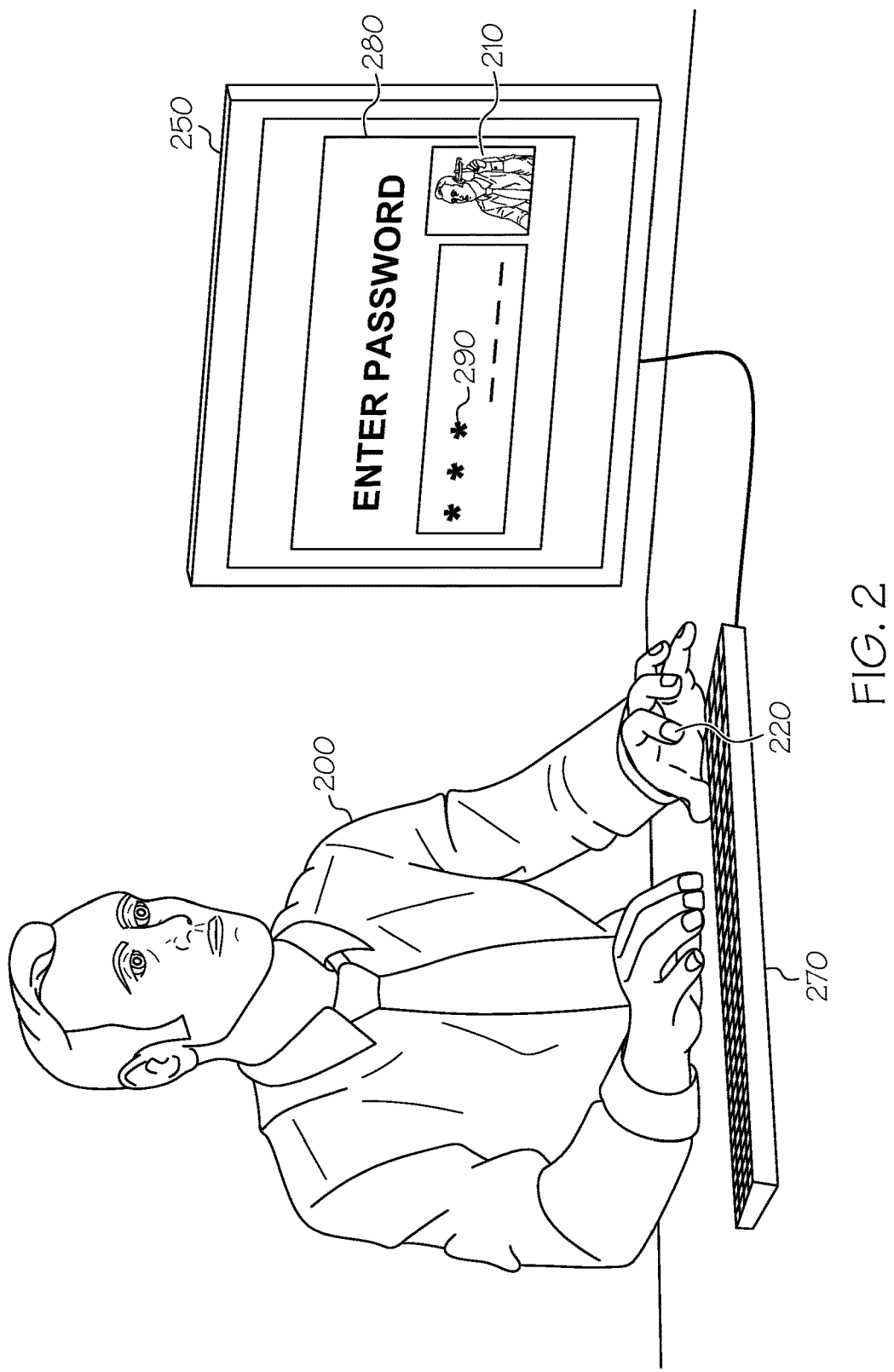
FIG. 2 illustrates a contemporaneous gesture by an avatar and keyboard entry by a user for increasing access to a restricted access device.

FIG. 2 illustrates a contemporaneous gesture by an avatar and keyboard entry by a user for increasing access to a restricted access device. User 200 is monitoring display 280 of device 250 which is showing a password entry screen and an avatar 210. Two characters of the password have been entered and the third character 290 is being entered with keystroke 220 in response to the avatar 210 performing a specific gesture, which in this example is similar to hand motion gesture 110. If the user had entered the third keystroke while the avatar was performing another gesture then the authentication would fail. In one example, the avatar may be substituted for the camera of FIG. 1. In this example, user 100 could only enter keystrokes 120, 122 and 124 when avatar was performing gestures similar to gestures 110, 112 and 114. One potential advantage of this example is the elimination of a need for camera 160. In another example, the avatar may be a participant in a virtual world where the avatar, through the user, seeks restricted access to components of the virtual world, such as access to currency for completing a purchase transaction.

Figure 3:
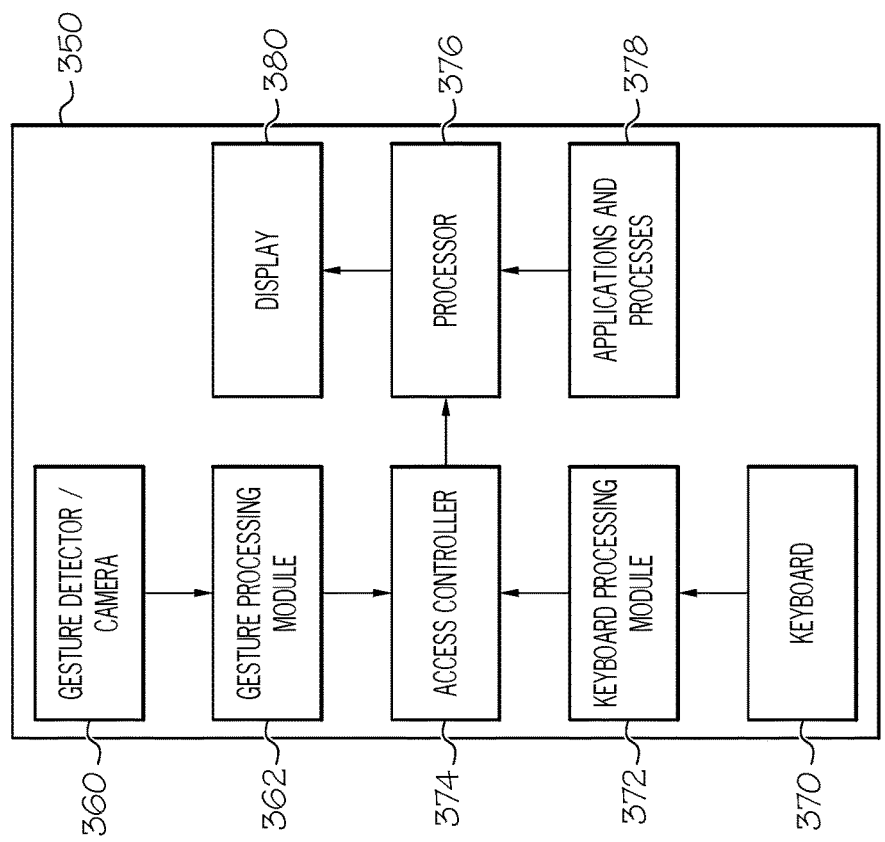
FIG. 3 illustrates an example block diagram of device for contemporaneous gesture and keyboard authentication.

FIG. 3 illustrates an example block diagram of device for contemporaneous gesture and keyboard authentication. Device 350 includes a gesture detector 360 which may be a camera, an optical transceiver, an optical array, a touch pad, a touchscreen, a motions sensing glove, article of clothing, a microphone, a piece of furniture or other system for detecting gestures by the user. Signals from gesture detector 360 are processed by gesture processing module 362 which determines gestures in a manner know to those familiar with the art. Keystrokes are received as keyboard entries on keyboard 370, which may be comprised of mechanical switches or buttons or a virtual keyboard implemented in any number of ways including a touchscreen such as those found on touchscreen cellphones and tablets. Keyboard processing module 372 processes keyboard entry keystrokes from keyboard 372. Access controller 374 receives processed gestures from gesture processing module 362 and keyboard entries from keyboard processing module 372 and compares the processed gesture with a predetermined gesture event associated with the keyboard entries and determines if an appropriate authentication has been received as described herein. If so, processor 376 is enabled to provide increased access to applications and processes 378 of device 350 that would otherwise be restricted. The user interacts with the device using display 380 as feedback during password entry via the keyboard and to interact with applications and processes of the device in a manner known to those familiar with the art. It should be appreciated that some processes and applications 378 may be available to the user without authentication such as power on/off control and use of a camera or emergency call on a cell phone. Examples of restricted access applications and processes may include internet access, word processing applications, and calendar and timer processes, to name a few. Any division between restricted and unrestricted applications and processes are considered to be within the scope of this description.

It should be further appreciated that any portion or combination of the processes, controls and modules of FIG. 3 can be implemented in a non-transitory computer programming product comprising a storage medium readable by a processing circuit and storing instructions for execution by the processing circuit of an application server for performing a methods described here.

Figure 4:
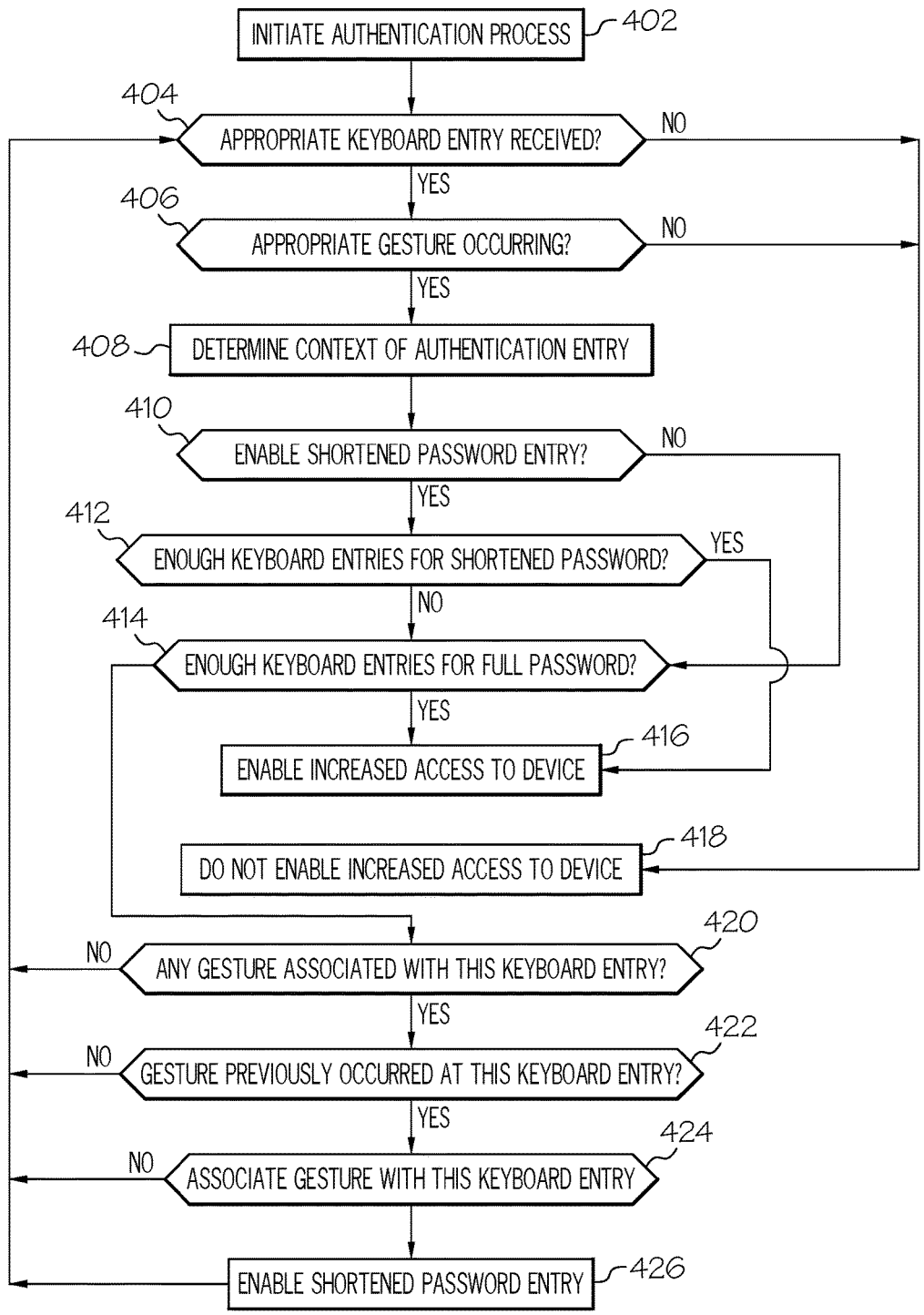
FIG. 4 illustrates an example of a flow diagram of a process for contemporaneous gesture and keyboard entry authentication.

FIG. 4 illustrates an example of a flow diagram of a process for contemporaneous gesture and keyboard entry authentication. In step 402 the authentication process is initiated. The authentication process includes any entry process that requires entry of predetermined keyboard entry password and gestures to enable increased access to device resources including applications and processes. Step 404 determines if an appropriate keyboard entry has been received. If not, then step 418 does not increase access to the restricted access device. This step detects if an improper key of the keyboard is pressed during entry of a password. If correct, then step 406 determines if an appropriate gesture is contemporaneously occurring. The appropriate gesture may be any predefined gesture and may occur during entry of a specific character of the keyboard entry of a password, or may occur any time before a specific keyboard entry of the password, depending upon the designer's chosen implementation. Note that a gesture is not user specific and biometric information specific to or indicative of the user is not necessary. For example, if the gesture is a wink of an eye, then any person winking their eye may make the gesture, the wink is not required to be made from a specific person having biometric characteristics matching specific biometric data.

If the appropriate gesture is required and has not occurred, then step 418 executes and access to the restricted access device is not increased. Step 408 determines the context of the authentication entry if the appropriate gesture was received (of if no gesture was received if none was required at the keystroke of step 404). Depending upon the context, as shortened password may be enabled. For example if the device is a cellphone, then a shortened password may be enabled when the context is operation within a moving vehicle, while a standard or lengthened password may be required when the device is stationary or at certain times of day. The lengthened password may or may not require a contemporaneous gesture. For the purposes of this description, all context variable passwords are considered to be within the scope of this description. In other examples, shortened passwords may always be enabled or always disabled, independent of the context. In another example, a longer password may require no gestures, while a shortened password may be utilized if an appropriate gesture or gestures are provided during entry of a first portion of the password.

If a shortened password is to be considered, then step 412 determines if enough keyboard entries have been made for a shortened password. For example, a device may require a twelve character password if no appropriate gestures were received and a seven character password (the seven characters may be considered the first portion of the twelve character password or a first password with the twelve characters being a second password) with three gestures at appropriate keystrokes as shown in FIG. 1. If the shortened password is enabled and if enough keyboard entries have been received for the shortened password in step 412, then step 416 enables increased access to the device. Else, step 414 determines if enough keyboard entries have been received for a full password, and if so step 416 enables increased access to the device.

If not enough entries are received at step 414 then optional steps 420-426 are executed prior to returning to step 404 to receive another keyboard entry. Steps 420-426 enable leaning of gestures either for enhanced authentication security or for a shortened password or for both. In other examples, the context of the authentication may also be learned for use in later executions of step 408. Step 420 determines if any gesture has been associated with this keyboard entry. For example, the user could be winking during the keyboard entry. If so, then data from one or more prior authentications are examined to determine if the gesture had occurred previously at this keyboard entry at step 422. If so, then step 424 associates the gesture with the keyboard entry to either enhance the security of the authentication process or to enable shortening of the authentication process. Step 426 then enables shortening of the password as previously described. Additional user or device administrator input may be required to enable the process of steps 420-426 and to select between a shortened password or an enhanced authentication or both.

The description herein describes a method comprising enabling increased access 426 to a restricted access device 150 based upon a gesture event 110 occurring while receiving a predetermined keyboard entry 120 from a user accessing the restricted access device. The enabling is independent of biometric information indicative of the user. The gesture event may be a facial gesture 112, 114 received from the user. The gesture event may include at least one of a hand gesture 110 and a spoke utterance received from the user. The restricted access device 250 may include a display 280 and the gesture event 210 may be a gesture made by an avatar rendered on the display by the restricted access device. The gesture event may include a facial gesture received from the user, the facial gesture including at least one of a smile, a frown, a blink, a wink, an open mouth and a closed mouth made by the user performing the keyboard entry. In another example, the gesture event may be an animated facial gesture received from the user, the animated facial gesture may include an at least one change from at least one of a smile, a frown, a straight face, a blink, a wink, an open mouth and a closed mouth to at least one of a smile, a frown, a blink, a wink, an open mouth and a closed mouth, the predetermined keyboard entry may include a password requiring multiple keyboard activations, and the gesture event may occur between a first keyboard activation and a last keyboard activation of the password. The number of keyboard activations in the password may be increased, 414, based upon the gesture event not being received. In another example, the predetermined keyboard entry may include a password requiring multiple keyboard activations 190, 192, 194, the gesture event may include at least a first gesture 110 and a second gesture 112 received from the user, and the enabling enables the increased access 416 based upon the first gesture 110 being received during a predetermined keyboard activation 120 of the password and the second gesture 112 being received during a another predetermined keyboard activation 122 of the password. In another example, an operational context of the restricted access device may be determined 408; and the number of keyboard activations in the password and a number of gestures in the gesture event may be modified 410 based upon the operational context. In another example a received gesture event 406 is received while receiving a keyboard entry 404 at the restricted access device; and the password may be shortened 426, wherein the enabling is based upon the received gesture event and the shortened password.

In another example, the description provides a restricted access device 350 comprising a keyboard processing module 372 for receiving a keyboard input signal from a keyboard 370 having a plurality of keys for receiving a keyboard entry and determining the keyboard entry to correspond to a password, and a gesture processing module 362 for processing a gesture input signal from a gesture detector 360 for detecting a gesture event and for determining the gesture event corresponds to a predetermined gesture event; and an access controller 374 coupled to the keyboard processing module 372 and the gesture processing module 362 for increasing access 416 to the restricted access device based upon the determining of the gesture event occurring contemporaneously with the password. The restricted access device may further comprise the keyboard 370 and the gesture detector 360 comprising a camera 160 for capturing an image of a face of user 100 operating the keyboard and performing a facial gesture event, wherein the access controller 374 further includes a facial gesture detector and the predetermined gesture event corresponds to a predetermined facial gesture event by the user, thereby increasing access to the restricted access device based upon a user operating the keyboard to enter the password while contemporaneously performing a facial gesture. In another example, the keyboard processing module further determines the keyboard entry to correspond to a second password having a first portion and a second portion, the first portion corresponding the password. The access controller further increases access to the restricted access device based upon the second password and an absence of the gesture event corresponding to the predetermined gesture. In another example, the predetermined keyboard entry includes a password requiring multiple keyboard activations, the gesture event includes at least a first gesture and a second gesture received from the user, and the enabling enables the increased access based upon the first gesture being received during a predetermined keyboard activation of the password and the second gesture being received during a another predetermined keyboard activation of the password.

In another example, a non-transitory computer program product comprises a storage medium readable by a processing circuit and storing instructions for execution by the processing circuit of an application server for performing a method comprising enabling increased access to a restricted access device based upon a gesture event occurring while contemporaneously receiving a predetermined keyboard entry from a user accessing the restricted access device. The gesture event may be an animated facial gesture received from the user, the animated facial gesture including an at least one change from at least one of a smile, a frown, a straight face, a blink, a wink, an open mouth and a closed mouth to at least one of a smile, a frown, a blink, a wink, an open mouth and a closed mouth. The predetermined keyboard entry includes a password requiring multiple keyboard activations, and the gesture event occurs between a first keyboard activation and a last keyboard activation of the password. The method may further comprise increasing a number of keyboard activations in password requiring multiple keyboard activations based upon the gesture event not being received.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the present application has been presented for purposes of illustration and description, but is not intended to be exhaustive or limited to the description in the form disclosed. Many modifications and variations will be apparent to those of ordinary skill in the art without departing from the scope of the description. The example was chosen and described in order to best explain the principles of the description and the practical application, and to enable others of ordinary skill in the art to understand the description for various examples with various modifications as are suited to the particular use contemplated.

What is claimed is:

1. A method comprising:
    enabling increased access to a restricted access device based upon an animated facial gesture event occurring while receiving a predetermined keyboard entry from a user accessing the restricted access device, and the animated facial gesture event occurs between a first keyboard activation and a last keyboard activation of a password, wherein the predetermined keyboard entry includes a password requiring multiple keyboard activations, the animated facial gesture event includes at least a first gesture and a second gesture received from the user, the enabling enables the increased access based upon the first gesture being received during a predetermined keyboard activation of the password and the second gesture being received during a another predetermined keyboard activation of the password; and
    decreasing a number of keyboard activations in the password based upon the animated facial gesture event being received.

2. The method according to claim 1 wherein the enabling is independent of biometric information indicative of the user.

3. The method according to claim 1 wherein the animated facial gesture event is a facial gesture received from the user.

4. The method according to claim 1 wherein the animated facial gesture event includes at least one of a hand gesture and a spoke utterance received from the user.

5. The method according to claim 1 wherein the restricted access device includes a display and the animated facial gesture event is a gesture made by an avatar rendered on the display by the restricted access device.

6. The method according to claim 1 wherein the animated facial gesture event includes at least one of a smile, a frown, a blink, a wink, an open mouth and a closed mouth made by the user performing a first keyboard activation and a second keyboard activation.

7. The method according to claim 1 wherein the animated facial gesture event includes at least one change from at least one of a smile, a frown, a straight face, a blink, a wink, an open mouth and a closed mouth to at least one of a smile, a frown, a blink, a wink, an open mouth and a closed mouth.

8. The method according to claim 7 wherein the predetermined keyboard entry includes a password requiring multiple keyboard activations.

9. The method according to claim 1 further comprising the step of:
   determining an operational context of the restricted access device; and
   modifying at least one of a number of keyboard activations and a number of gestures in the animated facial gesture event based upon the operational context.

10. The method according to claim 1 comprising the steps of:
    receiving a received animated facial gesture event while receiving a keyboard entry at the restricted access device; and
    shortening the password to correspond to the predetermined keyboard entry, wherein the enabling is based upon the received animated facial gesture event and the shortened password.

11. A restricted access device comprising:
    a memory;
    a display;
    a keyboard;
    a keyboard processor module, a gesture processing module, and an access controller in communication with said memory, said display, and said keyboard;
    the keyboard processing module for receiving a keyboard input signal from a keyboard having a plurality of keys for receiving a keyboard entry and determining the keyboard entry corresponds to a password, wherein the password requires multiple keyboard activations;
    the gesture processing module for processing an animated facial gesture input signal from a gesture detector for detecting a gesture event and for determining the gesture event corresponds to a predetermined gesture event, wherein the gesture event includes at least a first gesture and a second gesture;
    the access controller coupled to the keyboard processing module and the gesture processing module for increasing access to the restricted access device based upon the determining of the gesture event occurring contemporaneously with the password, the increasing access based upon the first gesture being received during a predetermined keyboard activation of the password and the second gesture being received during a another predetermined keyboard activation of the password;
    the gesture event occurs between a first keyboard activation and a last keyboard activation of the password; and
    decreasing a number of keyboard activations in the password based upon the gesture event being received.

12. The restricted access device according to claim 11 further comprising:
    the keyboard; and
    the gesture detector comprising a camera for capturing an image of a face of a user operating the keyboard and performing a facial gesture event, wherein
    the access controller further includes a facial gesture detector and the predetermined gesture event corresponds to a predetermined facial gesture event by the user, thereby increasing access to the restricted access device based upon the user operating the keyboard to enter the password while contemporaneously performing a facial gesture.

13. The restricted access device according to claim 11 wherein:
    the keyboard processing module further for determining the keyboard entry to correspond to a second password having a first portion and a second portion, the first portion corresponding the password,
    the access controller further increasing access to the restricted access device based upon the second password and an absence of the gesture event corresponding to the predetermined gesture event.

14. A non-transitory computer program product comprising:
    a storage medium readable by a processing circuit and storing instructions for execution by the processing circuit of an application server for performing a method comprising:
    enabling increased access to a restricted access device based upon an animated facial gesture event occurring while receiving a predetermined keyboard entry from a user accessing the restricted access device, and the animated facial gesture event occurs between a first keyboard activation and a last keyboard activation of a password, wherein the predetermined keyboard entry includes a password requiring multiple keyboard activations, the animated facial gesture event includes at least a first gesture and a second gesture received from the user, the enabling enables the increased access based upon the first gesture being received during a predetermined keyboard activation of the password and the second gesture being received during a another predetermined keyboard activation of the password; and
    decreasing a number of keyboard activations in the password based upon the animated facial gesture event being received.

15. The non-transitory computer programming product according to claim 14 wherein the enabling is independent of biometric information indicative of the user.

16. The non-transitory computer programming product according to claim 15 wherein the method further comprises the step of increasing a number of keyboard activations in password requiring multiple keyboard activations based upon the animated facial gesture event not being received.

17. The non-transitory computer programming product according to claim 14 wherein the animated facial gesture event including an at least one change from at least one of a smile, a frown, a straight face, a blink, a wink, an open mouth and a closed mouth to at least one of a smile, a frown, a blink, a wink, an open mouth and a closed mouth.

18. The non-transitory computer programming product according to claim 17 wherein the predetermined keyboard entry includes a password requiring multiple keyboard activations.

19. The non-transitory computer programming product according to claim 14 wherein the animated facial gesture event is a facial gesture received from the user.

20. The non-transitory computer programming product according to claim 14 wherein the animated facial gesture event includes at least one of a hand gesture and a spoke utterance received from the user.

* * * * *